Patented Oct. 23, 1951

2,572,141

UNITED STATES PATENT OFFICE 2,572,141

CONDENSATION OF ALDEHYDES

Leonard W. Harris, Richmond, Calif., assignor to California Spray-Chemical Corporation, Richmond, Calif., a corporation of Delaware No Drawing. Application February 11, 1946, Serial No. 646,967

5 Claims. (Cl. 260—613)

This invention relates to a new and improved method for carrying out a chemical reaction, namely, a condensation reaction between an aldehyde and a substituted aromatic hydrocarbon.

The known methods of carrying out reactions of this type consist of digesting a quantity of an aldehyde with a quantity of an aromatic compound in the presence of concentrated sulfuric acid, aluminum chloride, glacial acetic acid, zinc chloride, or acetic anhydride. For the most part, the descriptions in the literature of such reactions refer to the use of sulfuric acid or aluminum chloride as the condensing agent. Heretofore it has been considered necessary, when performing the reaction in the presence of sulfuric acid, to use a large volume of acid relative to the volume of reactants, as much as 200-300% by volume. When the reaction is carried out in this manner a common result is the formation of a gummy mass from which it is difficult to separate the desired end product in a pure state. I have discovered means whereby the reaction may be brought about much more efficiently, i. e., with a greater yield of the desired condensation product, concurrent with a lower consumption of reagent. Moreover, by carrying out the process in a manner to be described below, the desired end product is obtained relatively free from contaminating material and in a form which is easily separated from the reactants.

In order to obtain this improved result I reflux the aldehyde and aromatic in the presence of a catalyst which comprises a finely divided solid material impregnated with concentrated sulfuric acid, phosphoric acid or glacial acetic acid, and in the presence of a liquid which is a solvent for the aldehyde and aromatic material and which has little or no solvent power for water. During the refluxing of the above described materials, the water formed by the reaction forms a separate phase and this water is removed from the system continuously or semi-continuously while the solvent which has been vaporized and condensed is returned to the reaction vessel.

The process of this invention is not limited as to the aldehydes with which it may be used. Both aliphatic and aryl aldehydes respond to the condensation reaction under the conditions as described herein. For example, this process is effective in condensations involving chloral, benzaldehyde, substituted benzaldehyde, acetaldehyde or metaldehyde, and others. The aromatic compounds which respond to the conditions of the process of my invention are those which contain an active hydrogen atom, i. e., a readily replaceable hydrogen atom. As is well known, certain substituent groups tend to strongly activate a hydrogen atom on the benzene ring. Among such activating substituents are $OCH_3$, OH, and $NH_2$. Examples of aromatic compounds having highly active hydrogen atoms are phenol, anisol, aniline, and resorcinol.

The solvents which may be used in carrying out the process of my invention are, in general, such liquids as are immiscible with water but miscible with the reacting aldehyde and aromatic at boiling temperature, and at the same time are substantially inert chemically with respect to the reacting substances. In other words, a suitable solvent must be one which is capable of forming a binary boiling mixture with water, and substantially incapable of condensing with the aldehyde under the conditions described for carrying out the process of my invention. Among the solvents which I have found to be suitable for use in my process are benzene, xylene, toluene, and low boiling petroleum fractions.

The catalyst used in carrying out the process of my invention comprises finely divided inert solid, such, for example, as a clay or earth, which has been impregnated with a dehydrating acid, preferably sulfuric acid. Various solid substances may be used for this purpose, but I have found that best results are obtained from the use of microscopically porous absorbent material such as diatomite, fuller's earth, bentonite, montmorillonite, or the like. For best results the solid should be finely ground or powdered, and, before being impregnated with the acid, should be in a dry state. It may be dried by moderate heating, for example at 300°-400° F., for a suitable time. The acid and earth or other solid material are thoroughly mixed by mechanical means in order to produce a uniform distribution of the components. The proportions of acid to clay which may be used are not critical. It is unnecessary, however, to use so much acid as to form a slurry. I have found that a satisfactory catalyst may be prepared by incorporating earth and concentrated sulfuric acid in the ratio of 5 pounds of dry earth to 1.5-2.5 pounds of acid. Particularly good material for catalyst preparation is an adsorbent clay of the type which has previously been "activated" by digestion with acid. An example of such activated clay is the product known to the trade as "Superfiltrol." Various other solids may, however, be used for catalyst preparation, such, for example, as soapstone and talc.

In carrying out the process of this invention I use an amount of catalyst equal to from one to five per cent by weight of the combined weights of the reacting materials, i. e., the aldehyde and aromatic compound. The proportion of solvent used varies depending upon the nature of the reactants and solvent as well as upon the particular apparatus available for carrying out the process. In general, I find that about one volume of solvent to one or two volumes of reactants gives satisfactory results. It is not necessary to use a single substance as a solvent. In some cases it may be desirable to use a mixture of solvents, and this may be done providing the mixture has the properties stated above, i. e., immiscibility with water, etc.

The apparatus necessary for carrying out the method of my invention consists essentially of a pot boiler fitted with a reflux condenser and a water separator. The water separator serves as a trap for water which has been vaporized from the reacting mixture and has been condensed in the refluxer. Means are provided for withdrawing this condensed water from the system while returning nonaqueous condensate to the boiler.

The following is an example of one embodiment of the process of my invention, and relates to the formation of a condensation product from chloral and anisol. One mol of chloral hydrate, two moles of anisol, and five mols of benzene were placed in a flash fitted with a reflux condenser and a water separator (Dean and Stark moisture tube) for collecting the water which is boiled off during the reaction. Six grams of a catalyst consisting of finely powdered adsorbent clay impregnated with 96% sulfuric acid at the rate of about two parts of acid to five parts of clay by weight were introduced into the flask. The contents of the flask were then heated to boiling and refluxing was continued until water ceased to be given off. This required from two to three hours. Thereupon heating was stopped and the liquid solution remaining in the flask was decanted from the catalyst. The decanted liquid was distilled under vacuum while keeping the distillation temperature below 100° C. to avoid decomposition of the condensation product. By this means the solvent, benzene, was removed from the solution. The remaining liquid was poured out into a thin layer and allowed to solidify. It was found to consist largely of the crystalline produce 2,2,dianisyl-1,1,1-trichloroethane in a yield of about 90%. This compound has an exceedingly high value for use as an insecticide and, in the form obtained as described, is sufficiently pure without further refinement for use in compounding insecticides. It may be further purified, if desired, by recrystallization from methanol. The pure material so obtained has a melting point of 87-88° C.

A further example of the process of my invention is as follows: One mol of chloral hydrate, two mols of phenol, five mols of benzene and six grams of the catalyst were refluxed in a liter flask fitted with condenser and water separator for two to three hours. Toward the end of the reaction, or when practically all of the water was removed, the product, 2,2,bis-(parahydroxyphenyl) 1,1,1-trichloroethane crystallized even from boiling benzene. This product was removed from the benzene by filtration. The product was obtained in higher purity by recrystallization from methanol and water. The pure white crystals had a melting point of 202° C. with decomposition.

The above examples of the application of the process of my invention to specific reactions are illustrative only. The method may be applied with advantage to many other condensation reactions involving aldehydes and aryl compounds. In general, the reactions to which the described method is applicable may be represented as follows:

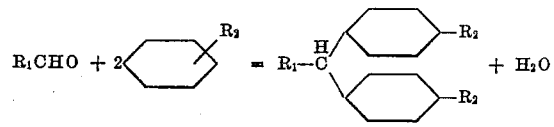

in which $R_1$ represents hydrogen, a hydrocarbon radical, or a substituted hydrocarbon radical, and $R_2$ represents such radicals as activate a ring hydrogen atom.

I claim:

1. A condensation reaction involving the reaction of an aldehyde and an aromatic compound possessing an active ring hydrogen atom and containing at least one radical —OR′, in which R′ is selected from the group consisting of hydrogen and an alkyl radical, which comprises dissolving said reactants in a mutual water-immiscible solvent, subjecting the resulting solution to reflux distillation in the presence of 1-5% by weight based on the total reactants of a catalyst comprising a finely-divided unreactive absorptive solid impregnated with surfuric acid and preventing the return of condensed water to the reaction system.

2. A condensation reaction involving the reaction of a chloral and an aromatic compound possessing an active ring hydrogen atom and containing at least one radical —OR′, in which R′ is selected from the group consisting of hydrogen and an alkyl radical, which comprises dissolving said reactants in a mutual water-immiscible solvent, subjecting the resulting solution to reflux distillation in the presence of 1-5% by weight based on the total reactants of a catalyst comprising a finely-divided unreactive absorptive solid impregnated with sulfuric acid and preventing the return of condensed water to the reaction system.

3. A condensation reaction involving the reaction of chloral and a methoxy aromatic compound possessing an active ring hydrogen atom comprising dissolving said reactants in a mutual solvent which is immiscible with water, subjecting the resulting solution to reflux distillation in the presence of 1 to 5% by weight, based on the total reactants, of a catalyst comprising a finely divided unreactive absorbtive solid impregnated with sulfuric acid, and preventing the return of condensed water to the system.

4. A condensation reaction involving the reaction of chloral and a hydroxy aromatic compound possessing an active ring hydrogen atom comprising dissolving said reactants in a mutual solvent which is immiscible with water, subjecting the resulting solution to reflux distillation in the presence of 1 to 5% by weight, based on the total reactants, of a catalyst comprising a finely divided unreactive absorbtive solid impregnated with a sulfuric acid, and preventing the return of condensed water to the system.

5. A condensation reaction involving the reaction of chloral and anisol comprising dissolving said reactants in a mutual solvent which is immiscible with water, subjecting the resulting solution to reflux distillation in the presence of 1 to 5% by weight, based on the total reactants, of a catalyst comprising a finely divided unreactive absorbtive solid impregnated with a sulfuric acid, and preventing the return of condensed water to the system.

LEONARD W. HARRIS.

REFERENCES CITED

The following references are of record in the file of this patent:

UNITED STATES PATENTS

| Number | Name | Date |
|---|---|---|
| 2,161,392 | Stevens et al. | June 6, 1939 |
| 2,275,182 | Ipatieff et al. | Mar. 3, 1942 |
| 2,329,074 | Muller | Sept. 7, 1943 |

OTHER REFERENCES

Bailes, "Journal of Chemical Education," vol. 22, page 122 (1945).

Elbs, "Journ. fur prakt. Chemie," vol. 47, page 68 (1893).

Callaham "Chemical and Metallurgical Engineering," vol. 51, pages 112–114 (1944).

DDT Report 44—2 (War Production Board), pages 1-3½ (1944).